Jan. 11, 1949.                 J. O. MESA                    2,459,039
                     AUTOMATIC POSITIONING APPARATUS
Filed June 26, 1945                                     2 Sheets-Sheet 1

Inventor
Joseph O. Mesa
By Williams, Bradbury & Hinkle
Attorneys

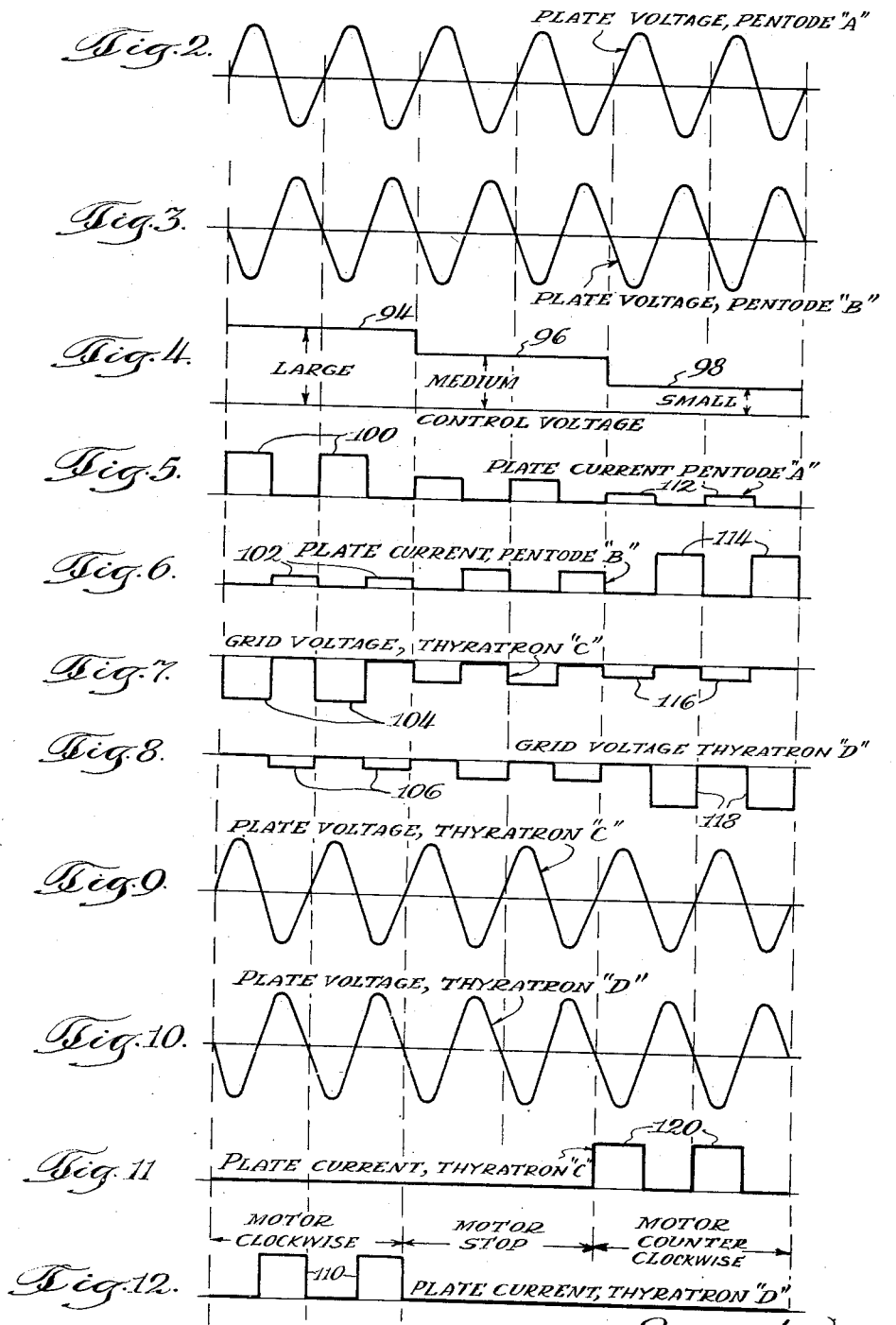

Patented Jan. 11, 1949

2,459,039

UNITED STATES PATENT OFFICE 2,459,039

AUTOMATIC POSITIONING APPARATUS

Joseph O. Mesa, Bayside, N. Y., assignor to Stewart-Warner Corporation, Chicago, Ill., a corporation of Virginia Application June 26, 1945, Serial No. 601,692

5 Claims. (Cl. 318—28)

The invention relates generally to automatic positioning apparatus, and more particularly to improved means for continuously adjusting the position of a part in response to changes in a control voltage.

In general, the invention includes an electronic apparatus for the control of a reversible motor to cause the latter to move a part to position corresponding to an input voltage applied to an electron discharge tube circuit, without utilizing relays or other parts which frequently fail to operate properly, and utilizing only simple commercially available components. The electronic circuit may be operated from a commercial source of alternating current, without the use of a power pack or other source of direct current.

The apparatus may be used for continuously adjusting the position of control means, such as a valve or a rheostat, in proportion to an external voltage, continuously recording the magnitude of a varying voltage, or continuously adjusting the angular position of a part such as a directional radio antenna in response to a voltage derived from the received signal wave. The apparatus is of particular utility in such systems in which the generator of the external voltage is incapable of supplying sufficient power directly to control the motion of the movable member without an intermediate power amplifying means.

In most previous types of apparatus for accomplishing this result, various combinations of relays and movable contacts were provided to control the motor which adjusted the position of the movable part, the systems generally including delicate instrumentalities requiring precision adjustment. Such delicately adjusted systems usually failed to operate properly in different positions to which they may have been subjected when used upon aircraft, in which case the parts are subjected to forces of gravitation and momentum of varying magnitude and direction.

It is therefore an object of the present invention to provide an automatic positioning apparatus responsive to an applied voltage, which is simple and rugged in construction, which will operate accurately when subjected to forces of gravitation and momentum of varying magnitude and direction, and which may be assembled from commercially available components by relatively unskilled labor.

A further object is to provide an improved electronic control circuit responsive to changes in an applied voltage, to adjust the position of a part to an extent corresponding to the applied voltage.

A further object is to provide an improved electronic apparatus for controlling the position of a part in response to an applied voltage, which is operable directly from a commercial source of alternating current, thereby eliminating the necessity of providing an auxiliary power supply.

A further object is to provide an improved control apparatus for converting an applied voltage into current pulses of polarity depending upon the amplitude of the applied voltage.

A further object is to provide an improved control apparatus for angularly positioning a directional radio antenna in response to the amplitude of a voltage derived from the signal received by such antenna.

In general, the apparatus comprises a pair of pentodes having their grids respectively connected to the input terminals and utilizing a common self-bias resistor. The plate circuits of each of these pentodes includes a secondary winding of a transformer, the primary winding of which may be connected to a suitable source of alternating current, such as a commercial source of 60 cycle, 115 volt current. The screen grid of one of these pentodes is maintained at a constant potential relative to the plate and cathode thereof, while the potential on the screen grid of the other pentode is varied in response to the movement of the part the position of which is controlled by the apparatus. Changes in plate current of these pentodes are reflected respectively as changes in potential on the control grids of thyratrons. The thyratrons are supplied with alternating plate current and each of the plate circuits of these thyratrons includes a field winding of a motor which is directly geared to the part to be positioned. It will thus be seen that the apparatus is of an extremely simple character, and it is a further object of the invention to provide an apparatus of such simple and rugged type.

Other objects of the invention will appear from the following description, reference being had to the accompanying drawings, in which:

Figs. 2 and 3 show the wave forms of the plate voltage on the two pentodes, as indicated by the legends;

Fig. 4 shows three distinct variations in the externally applied control or input voltage;

Figs. 5 and 6 represent respectively the plate current in the two pentodes under the voltage conditions represented in Fig. 4;

Figure 13:
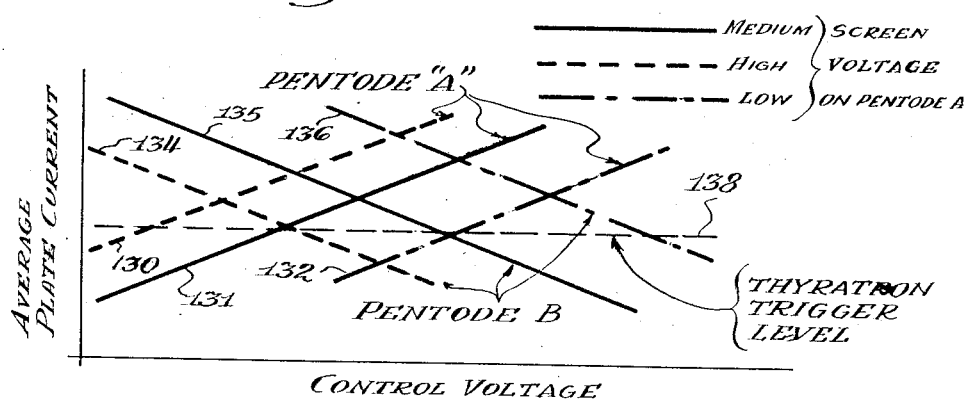

Figs. 7 and 8 respectively represent the grid voltages impressed upon the thyratrons under the input voltage conditions represented in Fig. 4;

Figs. 9 and 10 respectively represent the wave form of the plate voltage applied to two thyratrons;

Figs. 11 and 12 respectively represent the plate current of the two thyratrons when their grid voltages are as represented in Figs. 7 and 8, the legends indicating the direction of rotation of the motor controlled thereby; and Fig. 13 is a diagram indicating the changes in average plate current in the pentodes and thyratrons with changes in the control voltage.

Figure 1:
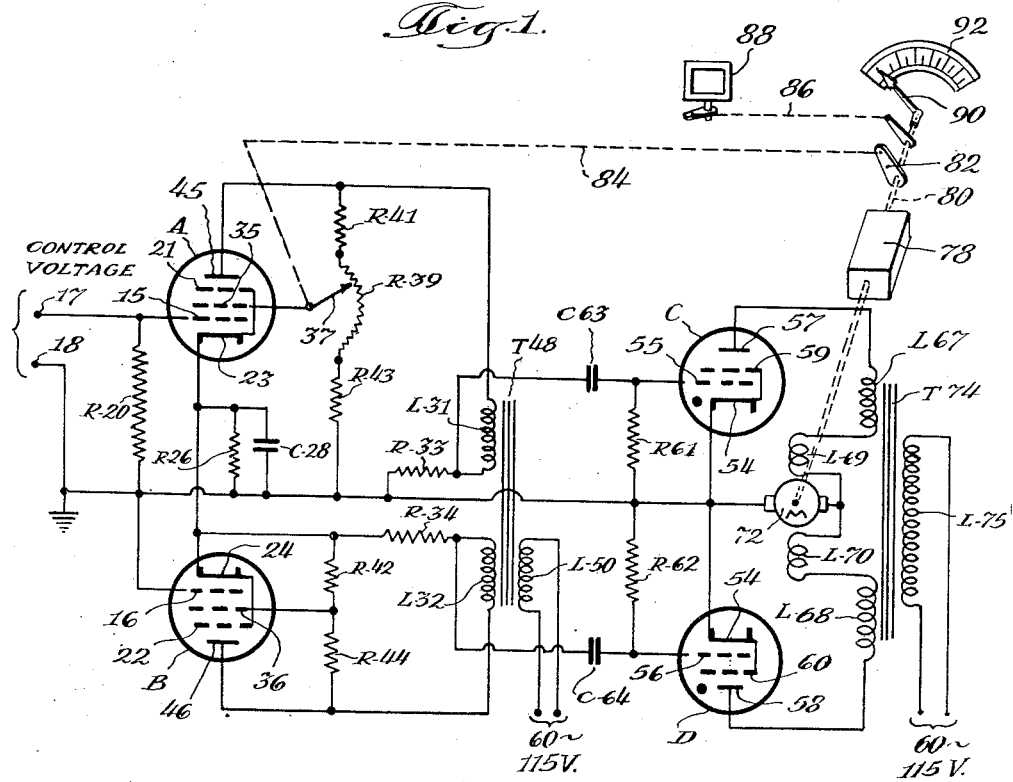
Fig. 1 is a diagram of the control apparatus with the circuits thereof shown schematically.

Referring to Fig. 1, the apparatus is illustrated as comprising a pair of pentodes A and B suitably coupled to thyratrons C and D. The control grid 15 of the pentode A and the control grid 16 of the pentode B, are respectively connected to input terminals 17 and 18. The terminals 17 and 18, as previously indicated, are adapted to be connected to any suitable source of control voltage, such, for example, as the rectified output voltage of a radio receiver having its input connected to a directional antenna. For purposes of this description, the terminal 18 may be considered as being the ground potential as indicated in the diagram, while the potential of the terminal 17 varies in response to some other condition, such as the amplitude of the signal received by a directional radio antenna, or a change in pressure, temperature, position, velocity, weight, or other condition.

A resistor R20 is connected between the grids 15 and 16, constituting a grid resistor for the input circuit of pentode A. The pentodes A and B have suppressor grids 21 and 22, preferably internally connected to their cathodes 23, 24, respectively. The cathodes 23, 24 are connected to ground through a common self-bias resistor R26 bypassed by a condenser C28. The plate to cathode circuit of the pentode A comprises a secondary winding L31 connected in series with a load resistor R33, as well as the self-bias resistor R26. Similarly, the plate circuit of the pentode B comprises a secondary winding L32 in series with a load resistor R34. The potential on the screen grid 35 of pentode A is determined by the position of the slider 37 which, with a resistor R39, forms a potentiometer, the resistance R39 being connected in series with resistors R41 and R43 connected between the plate 45 of pentode A and ground.

The screen grid 36 of pentode B is connected to the junction of voltage divider resistances R42 and R44 connected in series between the cathode 24 and the plate 46 of the pentode B. The windings L31 and L32 may form part of a single transformer T48 having a primary winding L50 connected to a suitable source of alternating current, such as a commercial 60 cycle, 115 volt source. The windings L31 and L32 are oppositely phased.

Thyratrons C and D are shown as comprising cathodes 54 connected to ground, control grids 55 and 56, anodes or plates 57 and 58, and suppressor grids 59 and 60, respectively connected internally to their cathodes 54. The grids 55 and 56 are respectively connected to ground through grid resistors R61 and R62, and are connected through coupling condensers C63 and C64 to the oppositely phased terminals of secondary windings L31 and L32, respectively.

The plate circuit of the thyratron C includes a secondary winding L67 in series with a field winding L69, and the armature winding of a reversible direct current motor 72. In a similar manner, the plate circuit of the thyratron D includes a secondary winding L68 in series with a field winding L70 and the armature of the motor 72, it being understood that the field windings L69 and L70 are arranged so that current flow through the plate circuit of thyratron C will cause the motor 72 to rotate in one direction while flow of plate current through the thyratron D will cause the motor to rotate in the opposite direction. The secondaries L67 and L68 may form part of a single transformer T74 having a primary winding L75 connected to a suitable source of alternating current, indicated as a commercial 60 cycle, 115 volt source.

The motor 72 is connected through a speed reducing gearing 78 with a shaft 80 which is connected through an arm 82 and any suitable mechanical connection 84 with the slider 37 of the potentiometer resistance R39. The shaft 80 may also be connected through any suitable mechanical linkage 86 with a directional radio antenna 88, and may be provided with a suitable indicator 90 cooperating with a graduated position indicating scale 92.

In operation, the control voltage is applied to the input terminals 17, 18, and thus impressed across the resistor R20. The plate voltages impressed upon the pentodes A and B are shown in Figs. 2 and 3, respectively, it being noted that they comprise substantially sinusoidal waves of opposite phase. The operation of the apparatus will be described with reference to Figs. 2 to 12, on the assumption that the control voltage impressed across the terminals 17, 18, is of the value indicated in Fig. 4.

During the first third of these curves, it is assumed that the voltage impressed across the terminals 17, 18, is relatively large, as indicated by the portion 94 of the curve of Fig. 4, that it is of medium amplitude during the middle portion of the curve, as represented by the portion 96 of the curve, and that it is of small or low amplitude during the last one-third portion of the curve, as represented by the portion 98 of this curve.

When the control voltage is relatively high, the plate current through pentode A will be in positive pulses 100 of relatively high amplitude, as indicated in Fig. 5. The plate current through pentode B, being 180° out of phase with respect to that of pentode A, will be of relatively low amplitude pulses 102, as shown in Fig. 6. This is due to the fact that the pentodes A and B have a common self-bias resistor R26 shunted by the condenser C28, so that when the pentode A draws substantial plate current, the grid bias on pentode B is correspondingly increased (due to the increased potential on the cathode 24); and the plate current pulses through the pentode B are correspondingly reduced in amplitude.

Due to the voltage drop across the plate load resistor R33, the voltage impressed upon the grid 55 of thyratron C will be of value represented by the curve of Fig. 7, comprising negative pulses 104 of substantial amplitude as shown in Fig. 7. Conversely, the voltage appearing on the grid of thyratron D will be of small amplitude negative pulses 106, as indicated in Fig. 8.

The plate voltages impressed upon the thyratrons C and D are of opposite phase, as indicated by the waves of Figs. 9 and 10. It will be assumed that the parameters of these thyratrons are such that a negative pulse of the amplitude of the pulses 104 of Fig. 7 will be sufficient to prevent ignition of the thyratron C, it being noted that these negative pulses on the grid of the thyratron C correspond in phase to the positive pulses of the plate voltage impressed on this thyratron, as indicated in Fig. 9.

The pulses 106 impressed upon the grid 56 of the thyratron D are, however, assumed to provide insufficient negative bias to prevent firing or triggering of the thyratron D, and as a result the plate current through the thyratron D will be in the form of pulses 110, shown in Fig. 12. The pulses 110 flowing through the plate circuit of thyratron D wil cause rotation of the motor 72 in one direction, for example, in a clockwise direction, and this rotation of the motor will result in swinging the potentiometer slider 37 in a clockwise direction, thereby reducing the potential difference between the screen grid 35 and the cathode 23 of the pentode A. Such reduction of the potential of the screen grid 35 relative to its cathode will decrease the amplitude of the plate current pulses in the pentode A.

The reduction in plate current through the pentode A will result in a decrease in the potential of the cathodes 23 and 24, and thus a decrease in the grid bias on the pentode B. Such decrease in grid bias will result in an increased plate current flow through the pentode B until the average plate current through pentodes A and B is substantially equal, or more specifically, until the bias on the input circuits of both the thyratrons C and D is sufficient to cut off, or prevent ignition, thereof. Since there will thus be no plate current flow through either the thyratrons C and D, the motor 72 will come to rest. As to the condition of the apparatus at this time, the control voltage applied to the input terminals 17, 18, may be considered as of medium value, represented by the portion 96 of the curve of Fig. 4.

As will be apparent from Figs. 5 and 6, the plate current pulses, and hence the average plate current through the pentodes A and B, will be equal and the grid voltages on the thyratrons C and D will both be insufficiently positive to trigger them. As a result, there will be no plate current flow through either of the thyratrons C and D. This is indicated by the intermediate portion of the curves of Figs. 11 and 12, represented by the "stop" portion of these curves.

If the control voltage impressed on the terminals 17, 18, subsequently decreases sufficiently, as represented by the portion 98 of the curve of Fig. 4, the plate current through pentode A will decrease to a low value represented by the pulses 112 of Fig. 5, and due to the common self-bias on the pentodes A and B, the plate current through pentode B will correspondingly increase, as represented by the pulses 114 of Fig. 6. Such change in plate current through the pentodes A and B will result in corresponding changes in grid voltage on the thyratrons C and D, as represented by the pulses 116 and 118, respectively, of Figs. 7 and 8. The pulses 116 are of sufficiently small negative value that the thyratron C will be triggered during the positive phases of its plate voltage, so that plate current will flow through thyratron C in pulses 120, as indicated in Fig. 11.

The grid voltage on the thyratron D being sufficiently negative to prevent ignition thereof, no plate current will flow through it and the motor 72 will therefore be driven in a counterclockwise direction. Such counterclockwise rotation of the motor 72 will result in driving the slider 37 of the potentiometer resistance R39 in a counterclockwise direction, to increase the potential difference between the screen 35 and cathode 23 of pentode A, with resultant increase of plate current flow through this pentode, until a condition of substantial balance is again attained. When this condition of substantial balance is attained, both thyratrons C and D will be cut off and the motor 72 will therefore not be energized.

As the motor rotates in one direction or the other, it will correspondingly position any part connected to the shaft 80 which it is desired to locate in a position corresponding to the control voltage impressed upon the input terminals 17, 18. Thus, for example, the directional antenna 88 may be shifted until it is in null position. Likewise, the position of the pointer 90 relative to the fixed scale 92 will indicate the voltage impressed across the input terminals 17, 18.

The directional antenna 88 and pointer 90 are representative of any part of an apparatus; such as a valve, stylus, rheostat, controller, etc., which it is desired to have assume a position corresponding to the amplitude of the control voltage.

The operation of the apparatus may be clarified by reference to Fig. 13, in which curves 130, 131, and 132 represent the increase in average plate current through the pentode A, with an increase in the control voltage impressed across the input terminals 17, 18, when the voltage of the screen voltage 35 of pentode A is respectively high, medium, and low. Similarly, the curves 134, 135, and 136 show how the average plate current through pentode B decreases as the control voltage impressed across the input terminals 17, 18, decreases, respectively when the voltage of the screen 35 is high, medium, and low with respect to its associated cathode 23. The dash line 138 in Fig. 13 represents the level of the average plate current through the pentodes A and B at which they will trigger their associated thyratrons C and D.

From the foregoing, it will appear that the apparatus will be effective to move any part connected to the shaft 80 to a position bearing a definite relationship to the control voltage impressed upon the input terminals 17, 18. It will also be clear that such positioning of the part is effected without the use of relays or other parts subject to faulty operation due to gravitational or momentum forces. Furthermore, it will be clear that the components of the apparatus are simple, commercially available elements, which may be assembled by relatively unskilled labor, since none of the parts require precision adjustment. The only initial adjustments which may be required under certain circumstances, relate to the mechanical driving connection 84 between the shaft 80 and the potentiometer slider 37, so that the latter will operate well within its useful range upon the application of a control voltage which may vary throughout a certain range.

In addition, it will be noted that the pentodes and thyratrons are supplied with plate current from an alternating current source which may be stepped up or down, as required by the parameters of the tubes by means of the transformers T43 and T74, so that by proper selection of these transformers, the electrical portion of the apparatus may be operated from any readily available alternating current source, without the necessity of providing the rectifying power supply system customarily used.

While I have shown and described a particular embodiment of my invention, it will be apparent that numerous variations and modifications thereof may be made without departing from the underlying principles of the invention. I therefore desire, by the following claims, to include within the scope of my invention all such variations and modifications by which substantially the results of my invention may be obtained through the use of substantially the same or equivalent means.

I claim:

1. In an apparatus for positioning a part in response to a varying control voltage, the combination of a pair of thermionic electron discharge devices each having a cathode, control grid, screen grid, and anode or plate; common self-bias means connected to the cathodes of said devices; an output circuit for each of said devices; circuit means for maintaining the control grids of said devices at the potential difference of the control voltage; a common self-bias resistor connected to the cathodes of said devices; means for impressing oppositely phased alternating plate voltages on the respective output circuits of said devices; means for adjusting the potential of the screen grid of one of said devices relative to its cathode; a pair of thyratrons, each having a cathode, control grid, and plate; means for coupling the plates of said devices to the control grids of said thyratrons so as to have the voltages thereon vary inversely with reference to the plate current flow through said devices respectively; means for impressing oppositely phased alternating voltage on the plates of said thyratrons; a reversible motor for moving the part to be positioned and having oppositely phased field windings respectively in the plate circuits of said thyratrons; and means mechanically coupled to said motor for varying the position of said screen potential adjusting means.

2. In an apparatus for positioning a part in response to a varying control voltage, the combination of a pair of input terminals for connection to the source of control voltage, a pair of thermionic electron discharge devices each having a cathode, control grid, screen grid, and anode or plate; an output circuit for each of said devices; conductors connecting the control grids of said devices respectively to said input terminals; a common self-bias resistor connected to the cathodes of said devices; means for impressing oppositely phased alternating plate voltages on the respective output circuits of said devices; means for adjusting the potential of the screen grid of one of said devices relative to its cathode; a pair of electron discharge tubes, each having a cathode, control grid, and plate; means coupling the plates of said devices to the control grids of said tubes so as to have the voltages thereon vary inversely with reference to the plate current flow through said devices respectively; means for impressing oppositely phased alternating voltage on the plates of said tubes; a reversible motor for moving the part to be positioned and having oppositely phased field windings respectively in the plate circuits of said tubes; and means mechanically coupled to said motor for varying the position of said screen potential adjusting means and to position the part.

3. In a control system, a pair of pentodes each having a cathode, an anode, a control grid, and a screen grid, means for varying the voltage on the control grid of one of said pentodes, output circuits for said pentodes including said anodes, means for impressing alternating voltages of opposite phase on said output circuits, common self-bias means for said pentodes, a source of control voltage coupled to the input of one of said pentodes, and means coupled to said output circuits responsive to changes in the relative average current therethrough to vary the screen grid voltage of one of said pentodes in a direction to maintain the average current in its output circuit at a given value.

4. In a control system, a pair of amplifying devices, each having input and output circuits, a control grid, cathode, and anode; means for impressing oppositely phased plate voltages on the output circuits of said devices; common self-bias means for said devices arranged to cause the grid voltage of one to change inversely with the average anode current of the other, whereby an increase of pulse height in the anode circuit of one brings about a decrease in the pulse height in the anode circuit of the other; a pair of gas filled tubes, each having an output circuit, a cathode, anode, and a control grid; a coupling between the anode circuit of each amplifying device and the control grid of one of said gas tubes; means for impressing alternating voltages of opposite phase upon the output circuits of said gas filled tubes; a motor having field windings of opposite polarity respectively in the output circuits of said gas filled tubes; means operated by said motor to change the gain of one of said amplifying devices in a direction to cause the amplitude of the average current in its output circuit to approach that of the other of said amplifying devices; and means for impressing a control voltage upon the input circuit of one of said amplifying devices.

5. In an apparatus for positioning a part in response to a changing control voltage, the combination of a pair of amplifying devices each having a cathode, control grid, screen grid, and anode, and each having an input circuit and an anode circuit; means coupling the source of control voltage to the input circuit of one of said devices; means for impressing alternating voltages of opposite phase upon the output circuits of said devices; common means for self-biasing said devices; a pair of thyratrons, each having a cathode, control grid, anode, and input and output circuits; means for respectively coupling the grids of said thyratrons to the output circuits of said amplifying devices so as to have the voltages of said grids responsive to changes in current flow in said output circuits respectively; means for impressing alternating voltages of opposite phase upon the output circuits of said thyratrons; means for varying the gain of one of said amplifying devices; a reversible electric motor connected in the output circuits of said thyratrons so as to rotate in a direction depending upon which of the thyratron output circuits carries the highest amplitude current; and means operated by said motor to position said part and simultaneously to operate said gain varying means.

JOSEPH O. MESA.

REFERENCES CITED

The following references are of record in the file of this patent:

UNITED STATES PATENTS

| Number | Name | Date |
|---|---|---|
| 2,126,910 | Moseley | Aug. 16, 1938 |
| 2,245,033 | Harrison | June 10, 1941 |
| 2,270,732 | Jones | Jan. 20, 1942 |
| 2,396,187 | Means et al. | Mar. 5, 1946 |